United States Patent
Takeda

(10) Patent No.: US 6,414,843 B1
(45) Date of Patent: Jul. 2, 2002

(54) COOLING SYSTEM FOR A COMPUTER APPARATUS

(75) Inventor: Yuuichi Takeda, Niigata (JP)

(73) Assignee: NEC Corporation, Tokyo (JP)

( * ) Notice: Subject to any disclaimer, the term of this patent is extended or adjusted under 35 U.S.C. 154(b) by 24 days.

(21) Appl. No.: 09/597,088

(22) Filed: Jun. 20, 2000

(30) Foreign Application Priority Data

Aug. 18, 1999 (JP) .......................................... 11-231857

(51) Int. Cl.[7] ................................................. G06F 1/20
(52) U.S. Cl. ..................... 361/687; 361/685; 361/692; 361/695; 165/104.32; 165/121; 454/184
(58) Field of Search ................................. 361/683, 687, 361/685, 690, 692, 695, 697, 724–727, 825; 154/184; 713/300, 322, 320; 702/65, 130, 132; 318/471, 341, 268, 272, 472, 473; 165/80.3, 121, 122, 104.32; 365/550, 550.01, 492; 395/750, 759, 182, 22.01–22.08; 340/584, 636

(56) References Cited

U.S. PATENT DOCUMENTS

| | | | |
|---|---|---|---|
| 4,756,473 A | * 7/1988 | Takemae et al. | 236/49 |
| 4,806,832 A | * 2/1989 | Muller | 318/334 |
| 5,197,858 A | * 3/1993 | Cheng | 417/14 |
| 5,687,079 A | * 11/1997 | Bauer et al. | 364/175 |
| 5,727,928 A | * 3/1998 | Brown | 417/44.11 |
| 5,764,506 A | * 6/1998 | Eynaud | 364/141 |
| 5,769,705 A | * 6/1998 | O'Callaghan et al. | 454/184 |
| 5,777,897 A | * 7/1998 | Giorgio et al. | 364/557 |
| 5,825,642 A | * 10/1998 | Ishii et al. | 363/141 |
| 5,848,282 A | * 12/1998 | Kang | 395/750.05 |
| 5,906,315 A | * 5/1999 | Lewis et al. | 236/49.3 |
| 5,942,866 A | * 8/1999 | Hsieh | 318/268 |
| 5,962,933 A | * 10/1999 | Henderson et al. | 307/126 |
| 5,963,887 A | * 10/1999 | Giorgio | 702/64 |
| 5,987,554 A | * 11/1999 | Liu et al. | 710/129 |
| 6,014,611 A | * 1/2000 | Arai et al. | 702/132 |
| 6,029,119 A | * 2/2000 | Atkinson | 364/557 |
| 6,054,823 A | * 4/2000 | Collings et al. | 318/439 |
| 6,070,253 A | * 5/2000 | Tavallaei et al. | 714/31 |
| 6,089,463 A | * 7/2000 | Hiroi | 236/49.3 |

(List continued on next page.)

FOREIGN PATENT DOCUMENTS

| | | | | |
|---|---|---|---|---|
| JP | 2-299009 | | 12/1990 | |
| JP | 3-97189 | | 4/1991 | |
| JP | 3-238515 | | 10/1991 | |
| JP | 4-265691 | | 9/1992 | |
| JP | 4-340111 | | 11/1992 | |
| JP | 06216553a | * | 8/1994 | .......... G05D/23/00 |
| JP | 08022345a | * | 1/1996 | ............. G06F/1/20 |
| JP | 9190244 A | * | 1/1996 | ............. F25D/1/00 |
| JP | 08063237 A | * | 3/1996 | .......... G05D/23/00 |
| JP | 10-275033 | | 10/1998 | |
| JP | 07175530 A | * | 12/1999 | ............. F25D/1/00 |

Primary Examiner—Darren Schuberg
Assistant Examiner—Mihael Datskovsky
(74) Attorney, Agent, or Firm—Sughrue Mion, PLLC

(57) ABSTRACT

To reduce signal wires of a cooling system of a computer, thereby providing a small cooling system. The cooling system for a computer of the present invention comprises a temperature sensor for measuring the temperature inside a computer; an SM bus controller for setting up prescribed temperatures and register values corresponding those temperatures, for reading out through an SM bus, and for notifying through another SM bus a fan rotation speed control IC of the register value corresponding the measured inside temperature; and the fan rotation speed control IC for supplying a cooling fan with a reference voltage defined by a reference voltage signal corresponding to a register value notified by the SM bus controller through the SM bus. Here, the fan rotation speed control IC sets up register values and reference voltage signal corresponding to the register values.

8 Claims, 5 Drawing Sheets

U.S. PATENT DOCUMENTS 6,134,667 A * 10/2000 Suzuki et al. ............... 713/300
6,182,902 B1 * 2/2001 Shih ........................... 236/35
6,188,187 B1 * 2/2001 Harlan ....................... 318/254
6,188,881 B1 * 2/2001 Blake ......................... 318/471
6,194,858 B1 * 2/2001 Chen .......................... 318/473
6,259,172 B1 * 7/2001 Lee ............................. 307/125

* cited by examiner

F I G.1
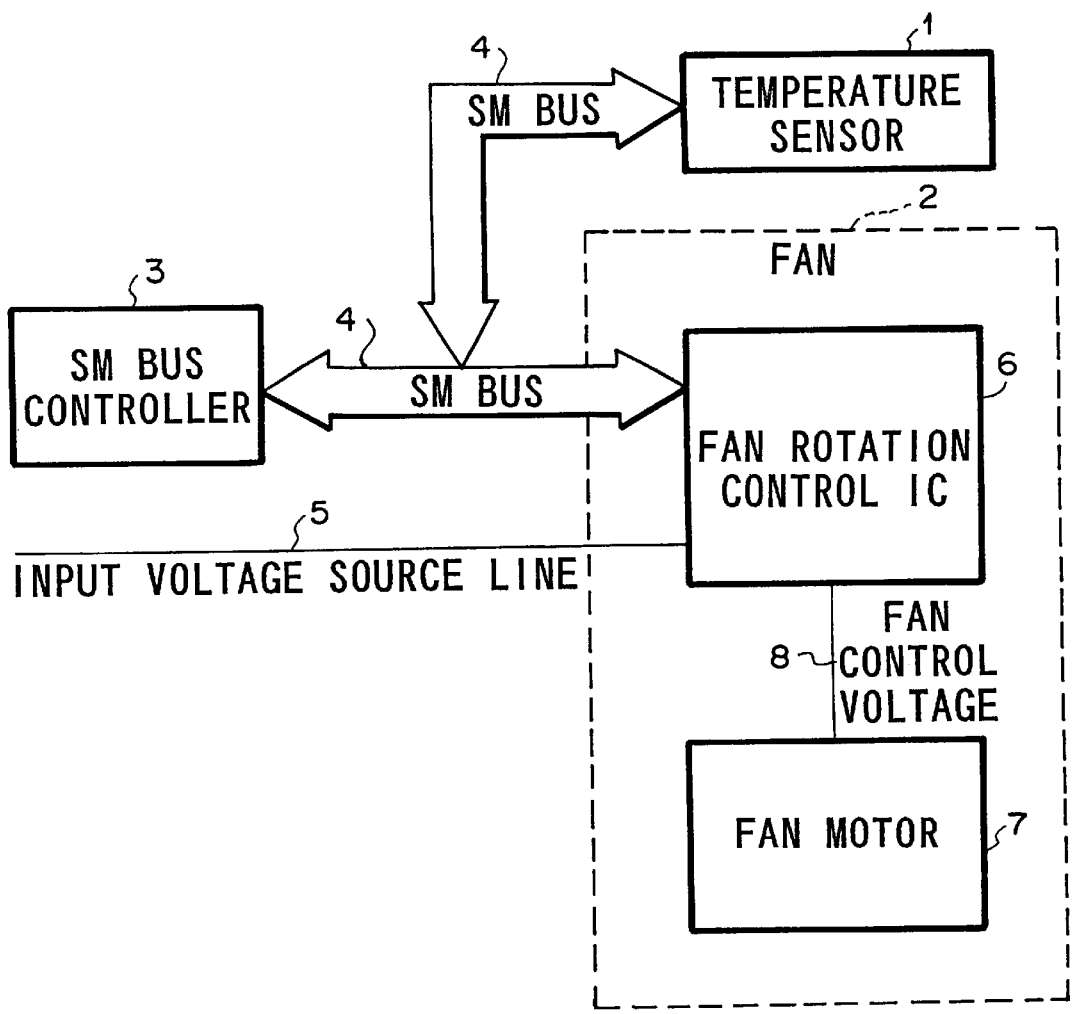

FIG. 4

| SENSOR TEMP. t (°C) | FAN ROTATION SET-UP REGISTER | REFERENCE VOLTAGE SIGNAL (V) | FAN ROTATION SPEED (rpm) |
|---|---|---|---|
| t < T1 | 0 0 | 0 | 0 (STOP) |
| t ≧ T1 | 0 1 | 4 | N1 |
| t ≧ T2 (>T1) | 1 0 | 5 | N2 (>N1) |
| (T1 < T2) | | | (N1 < N2) |

COOLING SYSTEM FOR A COMPUTER APPARATUS

BACKGROUND OF THE INVENTION

1. Technical Field of the Invention

The present invention relates to a cooling system for a computer and particularly, to a system for cooling a computer such as a personal computer by means of the system management (SM) bus.

2. Description of the Prior Art

Increase in temperature inside a computer apparatus can be prevented by using a cooling fan which introduces external air into the computer apparatus. Thus, the computer apparatus such as a personal computer maintains its performances, in spite of heat generated by electronic parts such as integrated circuits.

However, a ceaseless operation of the cooling fan is noisy and consumes much electric power. Therefore, it is desirable to suppress the temperature increase inside the computer apparatus, preventing noise and saving power consumption.

In JP 10-275033 A (1998), a cooling fan is switched off, when the inside temperature becomes lower than a prescribed temperature, by using a temperature sensor, while the cooling fan is switched on, when the temperature inside the computer apparatus reaches another prescribed temperature.

Further, in JP 4-340111 A (1992), the cooling fan is not only switched on/off, but also its rotational speed is controlled. The cooling system as disclosed in JP 4-340111 A (1992) is shown in FIG. 5. Temperature sensor 21 detects the temperature inside the computer apparatus. Memory 23 stores table 27 which describes a relation between the inside temperature and the rotational speed of the cooling fan. The rotational speed of cooling fan 26 is controlled by rotational speed controller, referring to table 27.

However, the cooling system as shown in FIG. 5 has a disadvantage that connection wires are increased and a size of the computer apparatus becomes large, because the connection wires and cables are required for all of the cooling system elements.

SUMMARY OF THE INVENTION

Therefore, an object of the present invention is to make it feasible to employ the SM bus in order to control the cooling fan inside a computer, thereby preventing noise, saving power consumption, and providing small sized computers.

A first cooling system for a computer of the present invention comprises an SM (System Management) bus controller for controlling the components on SM buses of the computer, a fan rotation speed control IC provided with an SM bus interface, and a temperature sensor provided with another SM bus.

A second cooling system for a computer of the present invention comprises a temperature sensor for measuring the temperature inside a computer; an SM bus controller for setting up prescribed temperatures and register values corresponding those temperatures, for reading out the temperature from the sensor through an SM bus, and for notifying a fan rotation speed control IC of the register value corresponding the measured inside temperature through another SM bus; and a fan rotation speed control IC for supplying a cooling fan with a reference voltage defined by a reference voltage signal corresponding to a register value notified by the SM bus controller through the SM bus. Here, the fan rotation speed control IC sets up register values and reference voltage signal corresponding to the register values.

A third cooling system for a computer of the present invention includes a specific type of the fan rotation speed control IC as described in the second cooling system. Concretely, the specific type of the fan rotation speed control IC comprises: a fan rotation set-up register for setting up register values and reference voltage signal corresponding to the register values, and for outputting a digital reference voltage signal corresponding to the register value, when the register value is notified from the SM bus controller through the SM bus; a D/A converter for converting the digital reference voltage signal into an analogue reference voltage signal; and a voltage source circuit comprising an operational amplifier and a transistor for inputting the analogue reference voltage signal, for generating a reference voltage corresponding to the analogue reference voltage signal, and for supplying a cooling fan with the generated reference voltage.

A fourth cooling system for a computer of the present invention is characterized in that the fan rotation speed control IC of the above-mentioned second and third cooling system is placed inside the cooling fan.

A fifth cooling system of a computer of the present invention is characterized in that a cooling fan is switched on/off. Concretely, the fifth cooling system comprises an SM bus controller for controlling the components on SM buses of the computer, a fan on/off control IC provided with an SM bus interface, and a temperature sensor provided with another SM bus.

A sixth cooling system for a computer of the present invention switching on/off a cooling fan, by using SM bus and SM bus controller. Concretely, the sixth cooling system of the present invention comprises a temperature sensor for measuring the temperature inside a computer; an SM bus controller for setting up prescribed temperatures and register values corresponding to those temperatures, for reading out the temperature from the sensor through an SM bus, and for notifying a fan on/off control IC of the register value corresponding to the measured inside temperature through another SM bus; and a fan on/off control IC for supplying a cooling fan with a reference voltage defined by a reference voltage signal corresponding to a register value notified by the SM bus controller through the SM bus. Here, the fan on/off control IC sets up register values and reference voltage signal corresponding to the register values.

A seventh cooling system for a computer of the present invention includes a specific type of the fan on/off control IC as described in the sixth cooling system. Concretely, the specific type of the fan on/off control IC comprises: a fan on/off set-up register for setting up register values and reference voltage signal corresponding to the register values, and for outputting a digital reference voltage signal corresponding to the register value, when the register value is notified from the SM bus controller through the SM bus; a D/A converter for converting the digital reference voltage signal into an analogue reference voltage signal; and a voltage source circuit comprising an operational amplifier and a transistor for inputting the analogue reference voltage signal, for generating a reference voltage corresponding to the analogue reference voltage signal, and for supplying a cooling fan with the generated reference voltage.

An eighth cooling system for a computer of the present invention is characterized in that the fan on/off control IC of the above-mentioned sixth and seventh cooling system is placed inside the cooling fan.

According to the present invention, the number of signal wires are reduced, due to the employment of SM bus.

Further, according to the present invention, the computer apparatus including its cooling system becomes small-sized, due to the employment of SM bus controller which controls not only the cooling system, but also the computer.

Further, according to the present invention, the mounting area is reduced, because FAN rotation speed control IC is mounted inside the FAN.

BRIEF EXPLANATION OF THE DRAWINGS

FIG. 1 is a block diagram of a cooling system for a computer of the present invention.

FIG. 4 is an exemplified table of temperature, register value, reference voltage signal.

PREFERRED EMBODIMENT OF THE INVENTION

Figure 2:
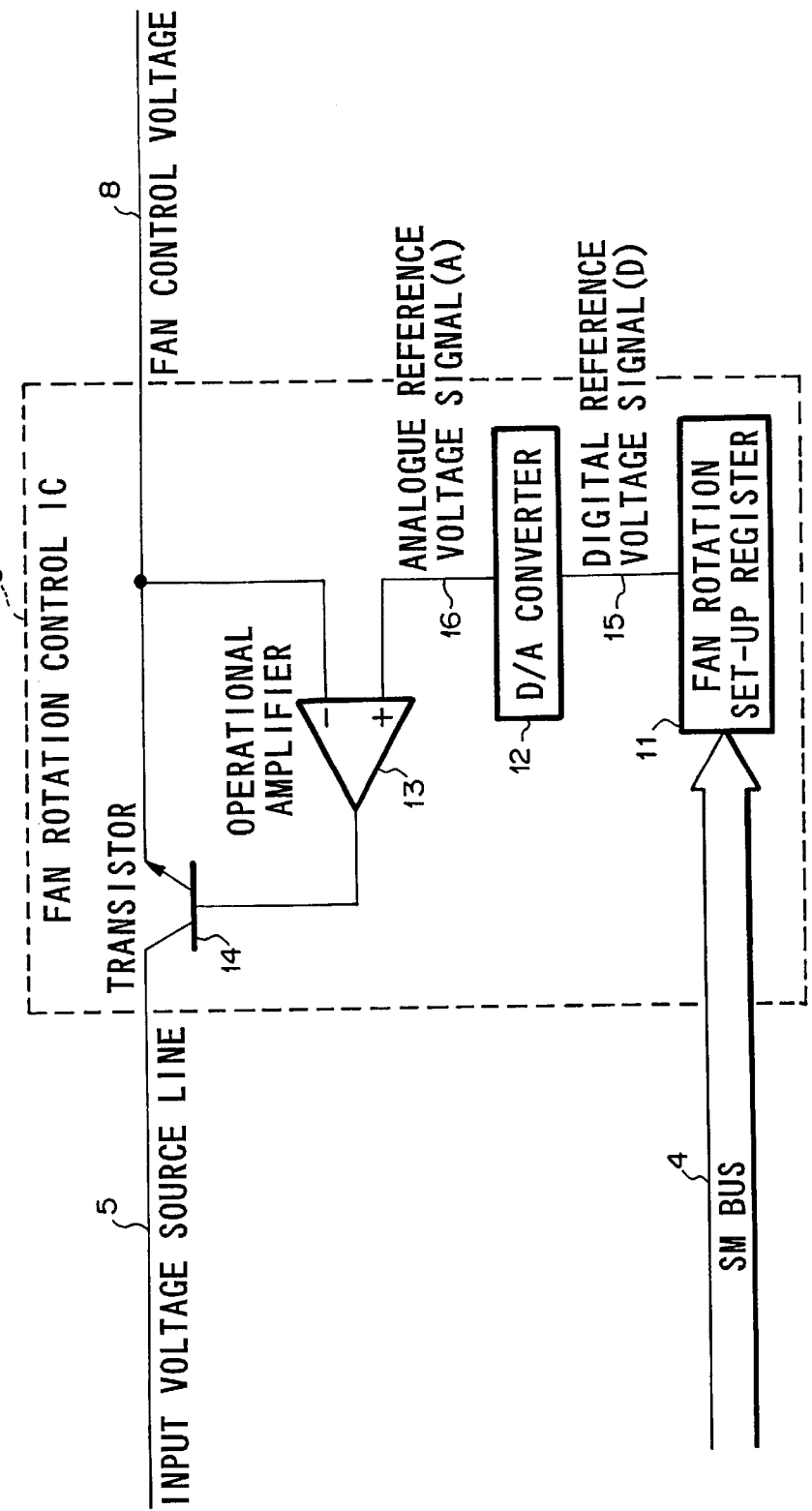
FIG. 2 is a block diagram of FAN rotation speed control IC as shown in FIG. 1.

Modes of embodiment of the present invention is explained, referring to the drawings.

FIG. 1 is a block diagram of the cooling system for a computer of the present invention.

Temperature sensor 1 is set up near the CPU (central processing unit) which generates much heat. The cooling system as shown in FIG. 1 further comprises a cooling fan FAN 2, system management (SM) bus controller 3, and SM bus 4.

SM bus by Intel for inter-component communications is a serial bus has two signal lines for carrying SM bus data and SM bus clock, respectively.

SM bus controller 3 is connected with temperature sensor 1 and FAN 2, by using the two signal line, respectively. SM controller controls each component such as IC of a personal computer, temperature sensor 1, and FAN 2.

FAN 2 comprises FAN rotation speed control IC 6, and FAN motor 7. Here, FAN motor 7 drives FAN 2 on the basis of FAN control voltage 8 outputted from FAN rotation speed control IC 6. FAN rotation speed control IC with SM bus interface for SM bus 4 controls the rotation speed of FAN 2.Input power supply line 5 from a non-shown power supply is also connected with FAN rotation speed control IC 6.

FIG. 2 is a block diagram of FAN rotation speed control IC 6 which is mounted inside FAN 2 is shown in FIG. 2. FAN rotation speed control IC 6 comprises FAN rotation set-up register 11, D/A converter 12, operational amplifier 13, and transistor 14. When a specific value is set up in FAN rotation set-up register 11 by an instruction from SM bus controller 3 through SM bus 4, FAN rotation set-up register 11 outputs digital reference voltage signal D 15 which is converted into analogue reference voltage signal A 16. Then, analogue reference voltage A 16 is fed into a voltage source circuit which comprises operational amplifier 13 and transistor 14. Concretely, analogue reference voltage a 16 is fed into the plus terminal of operational amplifier 13. Input voltage supply line 5 is connected with the collector of transistor 14, while the emitter of transistor 14 is connected with the minus input terminal of operational amplifier 13. Further, the output terminal of operational amplifier 13 is connected with the base of transistor 14. Thus, the reference voltage or FAN control voltage 8 from the emitter of transistor 14 is supplied to FAN motor 7.

Figure 3:
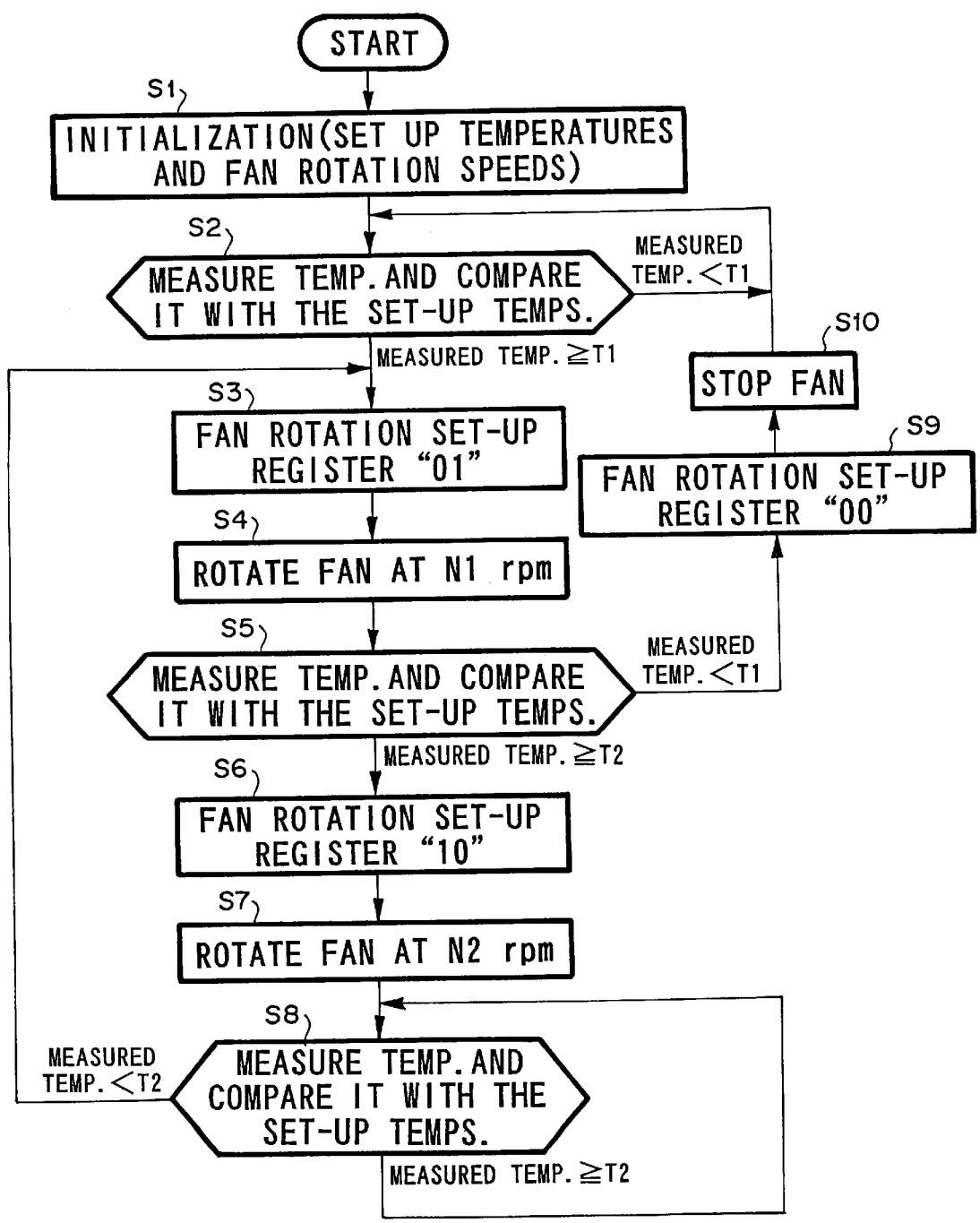
FIG. 3 is a flow chart for explaining an operation of the cooling system of the present invention.
Figure 5:
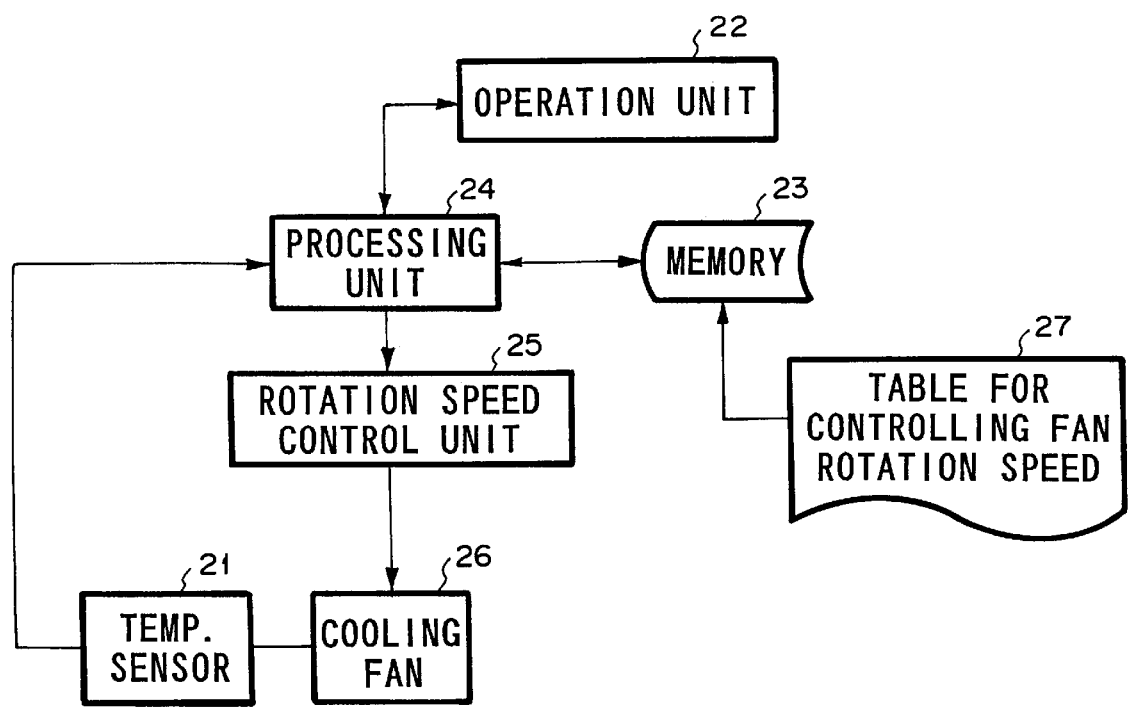
FIG. 5 is a block diagram of a conventional cooling system for a computer apparatus.

Next, the operation of the embodiment of the present invention is shown in FIGS. 3 and 4. FIG. 3 is a flow chart for explaining the operation of the embodiment of the present invention. FIG. 4 shows an example of set-up data of temperature, register value, and reference voltage signal. The set-up value is set up by the basic input output system (BIOS) of the personal computer. Reference voltage signal A 16 decides the voltage value of FAN control voltage 8 which is supplied to FAN motor 7. For example, FAN motor 7 rotates at N1 rpm, when reference voltage signal A 16 is 4 Volts, while FAN motor 7 rotates at N2 (>N1) rpm, when reference voltage signal A 16 is 5 Volts. When the temperature rises from T1 to T2, the rotation of FAN motor 7 increases from N1 to N2.

At step S1, when the personal computer starts up, SM bus controller 3 sets up and stores sensor temperatures and the corresponding FAN rotation set-up register values as shown in FIG. 4. Further, SM bus controller 3 sets up above-mentioned FAN rotation set-up register values and the corresponding reference voltage signals into FAN rotation set-up register 11 of FAN rotation speed control IC 6.

Next, at step S2, SM bus controller 3 compares the measured temperature outputted from temperature sensor 1 with the set-up temperatures, in order to decide whether the measured temperature reached T1 for rotating FAN 2. When the measured temperature does not yet reaches T1, SM bus controller 3 repeats reading out the measured temperature and comparing the measured temperature with the set-up temperatures.

On the other hand, at step S3, when the measured temperature reaches TI, SM bus controller 3 changes the register value in FAN rotation set-up register 11 from "00"(default) to "01", and further requests, through SM bus, rotating FAN 2.

Then, at step 4, FAN rotation speed control IC 6 accepts the request from SM bus 3, and converts, by using D/A converter 12, digital reference voltage signal D 15 (4 V) into analogue reference voltage signal A 16. Then, the reference voltage or FAN control voltage 8 of 4 V defined by analogue reference voltage signal A 16 is generated by operational amplifier 13 and transistor 14. FAN control voltage 8 is fed into FAN motor 7.

Then, at step S5, SM bus controller 3 reads out again the temperature measured by temperature sensor 1, compares it with the temperatures which are set up at step S1, and decides whether or not the rotation speed of FAN 2 should be changed.

When the measured temperature is lower than T1 at step S5, SM bus controller 3 changes the register value in FAN rotation control register 11 from "01" to "00" at step S9.

As a result, digital reference voltage signal D 15 is changed to 0 V. Thus, FAN control voltage 8 becomes 0 V to stop the rotation of FAN motor 7, at step 10. Then, SM bus controller 3 again reads out the measured temperature and compares it with the set-up temperatures, at step S2.

On the other hand, when the measured temperature is equal to or greater than T2, at step S5, SM bus controller 3 changes the register value in FAN rotation control register 11 from "01" to "10", at step S6.

At step S7, digital reference signal D 15 is changed to 5 V by changing the set-up value in FAN rotation control register 11. Therefore, FAN rotation speed control IC 6 outputs FAN control voltage of 5 V in order to rotate FAN motor 7 at N2 rpm. Thus, the rotation speed of FAN motor 7 is changed.

Next, at step S8, when the measured temperature is equal to or greater than T2, SM bus controller repeats reading out the measured temperature, while step S3 is started again, when the measured temperature is lower than T2.

FAN ON/OFF control IC may be employed for switching on/off FAN 2, in place of FAN rotation speed control IC 6. Further, a detection unit for detecting the operation state of the computer may be employed, in place of temperature sensor.

In the above explanation, the measured temperature is compared with T1. Even when the measured temperature is equal to or greater than T2, the above-explained steps S1, S2, S3 and S4 are still effective. In this case, step S2 is followed by steps S3 and, because the measured temperature is higher than T1. Therefore, FAN 2 rotates at N1. Then, immediately, step S4 is followed by steps S6 and S7, because the measured temperature is equal to or greater than T2. Finally, the rotation speed of FAN 2 reaches N2 rpm. Step S3 may be such a step that it is decided whether or not the measured temperature is in the range between T1 and T2.

Further, rotation speed may be 3 or more levels, in place of two levels of N1 and N2.

What is claimed is:

1. A cooling system for a computer including a plurality of components, wherein a rotation speed of a cooling fan inside the computer is controlled, which comprises:
   a system management (SM) bus connected with said components;
   a separate SM bus controller for controlling said components through said SM bus;
   a cooling fan rotation speed control integrated circuit (IC) 10 with an interface for said SM bus, and
   a temperature sensor with another interface for said SM bus,
   wherein said separate SM bus controller, said fan rotation speed control IC, and said temperature sensor control said rotation speed of said cooling fan.

2. A cooling system for a computer with a cooling fan, which comprises:
   a temperature sensor for measuring a temperature inside said computer;
   a separate system management (SM) bus controller for setting up prescribed temperatures and register values corresponding to those temperatures, for reading out said inside temperature through an SM bits connected with said temperature sensor, and for notifying said cooling fan rotation speed control IC of a register value corresponding to said temperature inside said computer, through another SM bus; and
   a cooling fan rotation speed control integrated circuit (IC) for supplying said cooling fan with a control voltage defined by a reference voltage signal corresponding to said register value notified by said separate SM bus controller,
   wherein said cooling fan rotation speed control IC sets up register values and reference voltage signals corresponding to said register values.

3. The cooling system according to claim 2, wherein said fan rotation speed control IC comprises:
   a fan rotation set-up register for setting up register values and digital reference voltage signals corresponding to said register values, and for outputting a digital reference voltage signal corresponding to said register value which is notified by said SM bus controller;
   a D/A converter for converting said digital reference voltage signal into an analogue reference voltage signal; and
   a voltage source circuit comprising an operational amplifier and a transistor for inputting said analogue reference voltage signal, for generating a fan control voltage corresponding to said analogue reference voltage signal, and for supplying said cooling fan with said fan control voltage, wherein:
     a collector of said transistor is connected with a line from a voltage source;
     an emitter of said transistor for outputting said fan control voltage is connected with the minus input terminal of said operational amplifier;
     a base of said transistor is connected with an output terminal of said operational amplifier;
     a plus input terminal of said operational amplifier is connected with said D/A converter.

4. The cooling system according to claim 2, wherein said fan rotation speed control IC is placed inside said cooling fan.

5. A cooling system for a computer including a plurality of components, wherein a cooling fan inside the computer is switched on and off, which comprises:
   a system management (SM) bus connected with said components;
   an separate SM bus controller for controlling said components through said SM bus;
   a cooling fan on/off control integrated circuit (IC) with an 10 interface for said SM bus; and
   a temperature sensor with another interface for said SM bus,
   wherein said separate SM bus controller, said fan on/off control IC, and said temperature sensor switch on and off said cooling fan.

6. A cooling system for a computer with a cooling fan, which comprises:
   a temperature sensor for measuring a temperature inside said computer and
   a separate system management (SM) bus controller for setting up prescribed temperatures and register values corresponding to those temperatures, for reading out said inside temperature through an SM bus connected with said temperature sensor, and for notifying said cooling fan on/off control IC of a register value corresponding to said temperature inside said computer through another SM Bus;
   wherein said cooling fan on/off control IC supplies said cooling fan with a control voltage defined by a reference voltage signal corresponding to said register value notified by said separate SM bus controller, and wherein said cooling fan on/off control IC sets up register values and reference voltage signals corresponding to said register values.

7. The cooling system according to claim 6, wherein said fan on/off control IC comprises:
   a fan on/off set-up register for setting up register values and digital reference voltage signals corresponding to said register values, and for outputting a digital reference voltage signal corresponding to said register value which is notified by said SM bus controller;
   a D/A converter for converting said digital reference voltage signal into an analogue reference voltage signal; and
   a voltage source circuit comprising an operational amplifier and a transistor for inputting said analogue reference voltage signal, for generating a fan control voltage corresponding to said analogue reference voltage signal, and for supplying said cooling fan with said fan control voltage, wherein:

a collector of said transistor is connected with a line from a voltage source;

an emitter of said transistor for outputting said fan control voltage is connected with the minus input terminal of said operational amplifier;

a base of said transistor is connected with an output terminal of said operational amplifier;

a plus input terminal of said operational amplifier is connected with said D/A converter.

8. The cooling system according to claim 6, wherein fan rotation speed control IC is placed inside said cooling fan.

* * * * *